United States Patent [19]

Remby

[11] Patent Number: 5,158,254

[45] Date of Patent: Oct. 27, 1992

[54] HOSE GUIDING DEVICE

[76] Inventor: Thomas D. Remby, 13312 Hollyhock Pl., Richmond, Va. 23233

[21] Appl. No.: 772,345

[22] Filed: Oct. 7, 1991

[51] Int. Cl.$^5$ .............................................. B05B 15/06
[52] U.S. Cl. ....................................... 248/76; 248/87; 248/156
[58] Field of Search ........................ 248/75, 76, 80, 87, 248/156, 315, 500, 62, 74.1; 135/118

[56] References Cited

U.S. PATENT DOCUMENTS

| | | | |
|---|---|---|---|
| 2,657,096 | 10/1953 | Holmes | 248/76 X |
| 2,757,962 | 8/1956 | MacLeod | 248/87 X |
| 2,846,189 | 8/1958 | MacLaughlin | 248/76 X |
| 2,954,194 | 9/1960 | Alfano | 248/87 |
| 3,232,570 | 2/1966 | Schneider, Jr. | 248/87 |
| 3,239,174 | 3/1966 | Churchman | 248/87 |
| 3,304,038 | 2/1967 | Guthrie | 248/76 |
| 3,534,751 | 10/1970 | Peters | 135/118 |
| 3,588,012 | 6/1971 | Schaefer | 248/80 |
| 3,990,454 | 11/1976 | Schlesinger | 248/75 X |
| 4,306,698 | 12/1981 | Gonia et al. | 248/74.1 |
| 4,440,370 | 4/1984 | Rood | 248/75 |

FOREIGN PATENT DOCUMENTS 899779  6/1962  United Kingdom .................. 248/87

Primary Examiner—Derek J. Berger
Attorney, Agent, or Firm—Haverstock, Garrett & Roberts

[57] ABSTRACT

A hose guiding device for guiding a hose through a garden includes a member having a conduit, the conduit having a first end and a second end, the conduit adapted to receive the hose through a first opening in the first end and through the conduit and out through a second opening in the second end. The device further includes retaining members which are inserted through channels in the device to secure the device to the ground to prevent movement of the device during use.

16 Claims, 2 Drawing Sheets

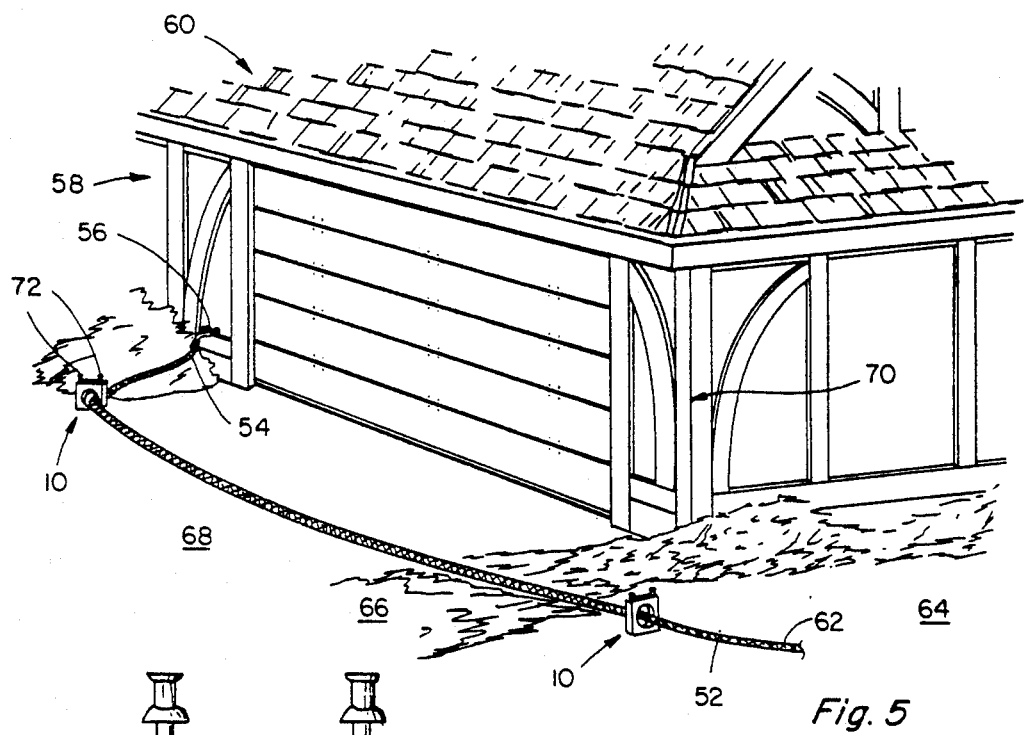
Fig. 5
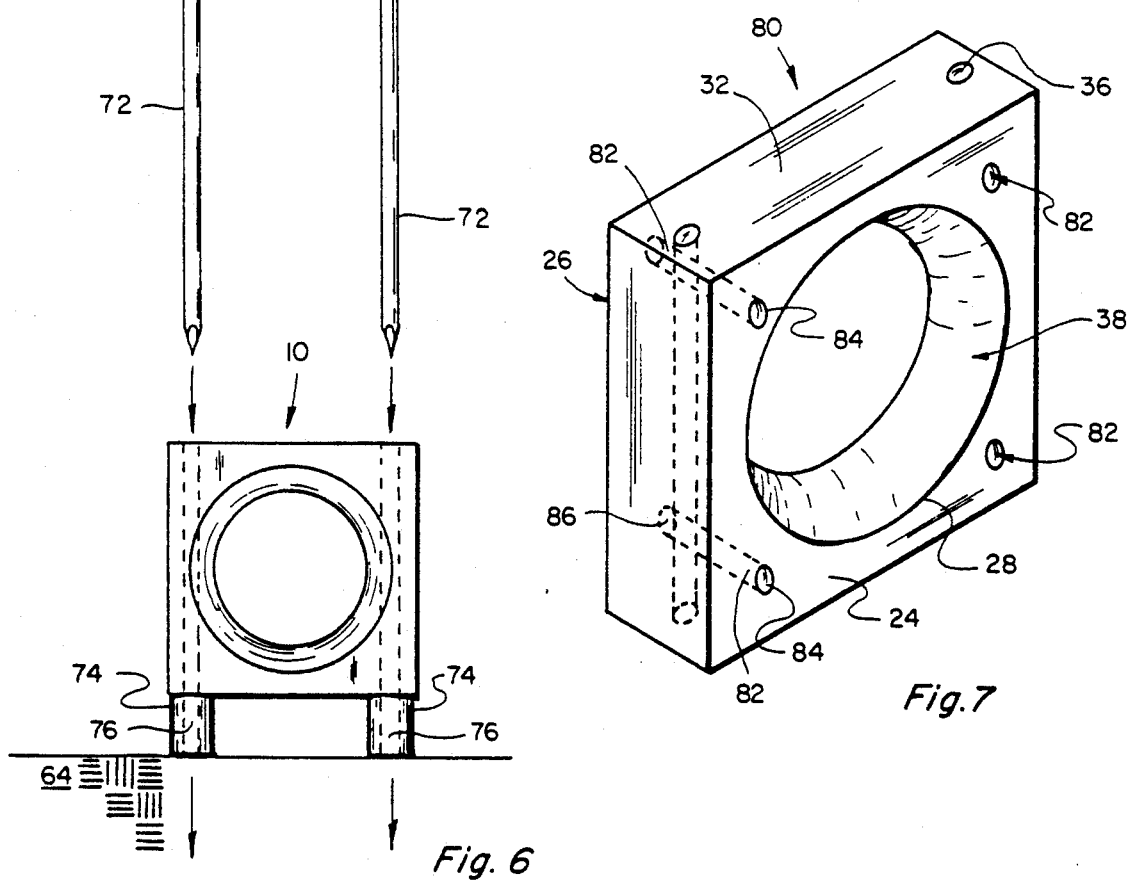
Fig. 6
Fig. 7

HOSE GUIDING DEVICE

BACKGROUND OF THE INVENTION

Present invention relates to a device for guiding a hose and more particularly to a device for guiding a hose through an area, such as a garden or other landscaped area, which is to be protected from damage by movement of the hose.

In order to water a lawn or a garden it is common to have a hose connected to a water faucet with the faucet being located at a side of a house. Additionally, the hose may be connected to a reel assembly to facilitate winding and unwinding of the hose. Typically, the hose is moved from side to side on the ground when watering different parts of the lawn or yard. Gardens and flower beds are sometimes located next to the sides of homes and directly near the water faucet to which the hose is connected. If sufficient care is not exercised the hose, when moved side to side or being retracted by the reel assembly, can damage the garden and the flower bed. Additionally, it is quite frequent that other obstacles, such as the house itself or trees, may prevent or hinder movement of the hose. Therefore, it would be advantageous to guide the hose around such obstacles.

The applicant of the present invention is unaware of any prior art devices that have been proposed to solve the problem of protecting gardens, flower beds, or other landscaping from being damaged by hoses. In view of this, there is a need for a hose guiding device which serves to protect gardens and flower beds from being destroyed or damaged by hoses. Additionally, it would be beneficial if such hose guiding device be of simple design and construction and easy to use.

The present invention is designed to obviate and overcome many of the disadvantages and shortcomings experienced with using a hose near a garden. The present invention can be easily utilized to protect the garden from inadvertent damage associated with use of a hose. The present invention is also economical to produce and does not require that the hose or the garden be modified to accommodate the invention. The present invention is also useful in guiding or directing the hose around an obstacle in the yard, such as a tree.

SUMMARY OF THE INVENTION

The hose guiding device of the present invention is designed and intended to protect gardens or flower beds from being damaged or destroyed by a hose. The hose guiding device comprises a member having a conduit, the conduit having a first end and a second end, the conduit having a first opening located at the first end and a second opening located at the second end, the member adapted to receive the hose through the first opening and through the conduit and out through the second opening, means, disposed in the conduit between the first opening and the second opening, for facilitating movement of the hose through the first opening, the conduit, and out through the second opening, and means for securing the member to the ground to prevent movement of the device during use.

In light of the foregoing comments, it will be recognized that a principal object of the present invention is to protect gardens and flower beds from damage when using a hose.

A further object of the invention is to provide a hose guiding device which is of simple construction and design and which can be easily employed with highly reliable results.

Another object of the invention is to provide a hose guiding device which is of unitary construction and which does not require modification of the hose.

A still further object of the invention is to provide a hose guiding device which is capable of directing the hose around an obstacle.

These and other objects and advantages of the present invention will become apparent after considering the following detailed specification in conjunction with the accompanying drawings, wherein:

BRIEF DESCRIPTION OF THE DRAWINGS

FIG. 5 is a view depicting the positioning of the hose guiding device of FIG. 1 in proper position for guiding a hose through a garden and around an obstacle;

FIG. 6 is a front view of the hose guiding device showing placement of stakes and spacers; and FIG. 7 is a perspective view of a second embodiment of the hose guiding device constructed according to the present invention.

DETAILED DESCRIPTION OF THE PREFERRED EMBODIMENTS

Figure 1:
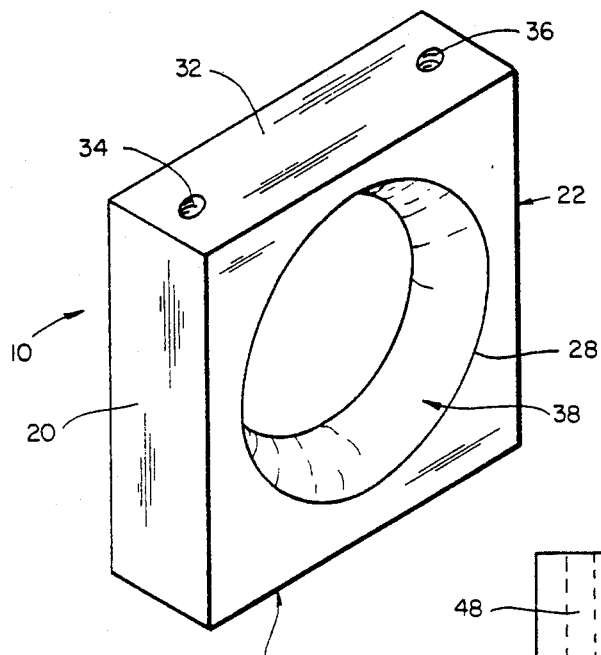
FIG. 1 is a perspective view of a preferred embodiment of a hose guiding device constructed according to the present invention.
Figure 4:
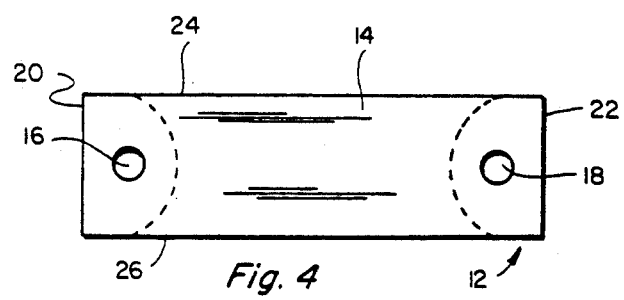
FIG. 4 is a bottom view of the hose guiding device of FIG. 2.

Referring now to the drawings, wherein like numerals refer to like items, number 10 identifies a preferred embodiment of a hose guiding device of the present invention. Referring now in particular to FIGS. 1 and 4, the hose guiding device 10 includes a base member 12 having a ground engaging surface 14 and apertures 16 and 18. The device 10 includes side members 20 and 22 extending upwardly from the base member 12 and a first end member 24 and a second end member 26 extending upwardly from the base member 12. The first end member 24 has a first opening 28 through which a hose (not shown) is inserted. The second end member 26 has a second opening 30 through which the hose is removed. A top member 32 extends between the side members 20 and 22 and the end members 24 and 26. The top member 32 has apertures 34 and 36 which are aligned with the apertures 16 and 18, respectively, of the base member 12.

Figure 2:
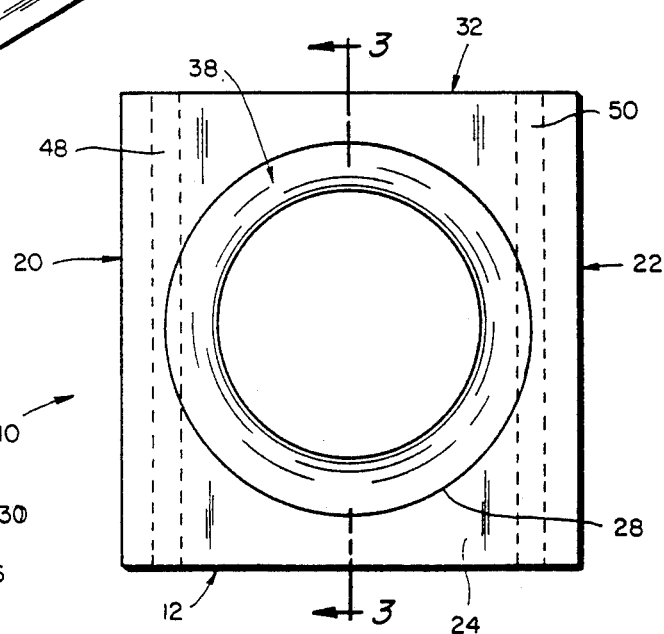
FIG. 2 is a front view of the hose guiding device of FIG. 1.
Figure 3:
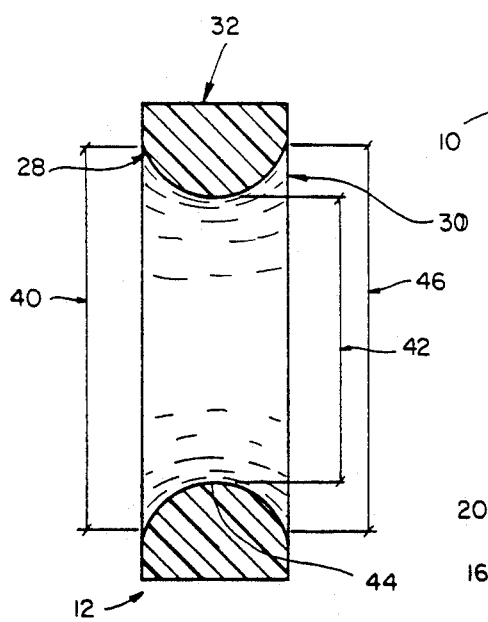
FIG. 3 is a cross sectional view of the hose guiding device taken along the plane of line 3—3 of FIG. 2.

A conduit or inner surface 38, as is most clearly depicted in FIGS. 1-3, is formed between the openings 28 and 30 of the end members 24 and 26 and between the side members 20 and 22. The inner surface 38 is annular in shape and as shown in FIG. 3 has a first diameter 40 adjacent the first opening 28 and a second diameter 42 at a position 44 between the first opening 28 and the second opening 30. Such position 44 being located at the midpoint between the first opening 28 and the second opening 30. The second diameter 42 is shown to be less than the first diameter 40. The inner surface is thus formed having a hump shape to facilitate movement of a hose through the device 10. A third diameter 46 is located adjacent to the second opening 30. The third diameter 46 is equal to the first diameter 40 and greater than the second diameter 42.

FIG. 2 illustrates the device 10 including channels 48 and 50 (shown in phantom) which run the length of the device 10. The channels 48 and 50 are aligned with the holes 16 and 34 and 18 and 36, respectively.

FIG. 5 depicts two of the hose guiding devices 10 receiving a hose 52 inserted all the way through both of the devices 10. One end 54 of the hose 52 is shown connected to a water faucet 56 on a side 58 of a house 60. The other end 62 of the hose 52 is used to water the ground or a lawn 64. One of the hose guiding devices 10 is shown positioned in a garden 66 and guides the hose 52 through the garden 66. As can be appreciated, with the hose 52 inserted through the hose guiding devices 10 movement of the hose 52 will not disturb or destroy the garden 66. The hose guiding devices 10 also act to direct the hose 52 across a driveway 68 and around a corner 70 of the house 60. The hose guiding devices 10 allow the hose to be directed around obstacles such as the driveway 68 and the corner of the house 70. Although two hose guiding devices 10 are illustrated in FIG. 5 it is also possible to have one hose guiding device 10 or more than two hose guiding devices depending upon the particular application.

Additionally, retaining members 72 are shown inserted through the channels 48 and 50 into the ground 64. The hose guiding devices 10 are secured and movement of the hose 52 will not move the hose guiding devices 10 in the garden 66. As can be appreciated, with the retaining members 72 inserted through the channels 48 and 50 the devices are secured and establish a guiding configuration for the hose. The guiding configuration is thereafter maintainable while the hose 52 is removed from the devices 10 and whereby the hose 52 can upon return be repositioned through the devices 10 to reestablish the guiding configuration.

The hose guiding device 10 is shown in FIG. 6 positioned on the ground 64 of the garden 66. The retaining members 72 are shown to be tack shaped stakes that are adapted to be inserted through the channels 48 and 50 and driven into the ground 64. In this manner the hose guiding device 10 is secured in position to insure that the hose guiding device 10 does not move during use. Spacers 74 are also shown inserted between the ground 64 and the base member 12 of the device 10. The spacers 74 allow the device 10 to be placed off of the ground 64. The spacers 74 include channels 76 (shown in phantom) which are aligned with the channels 48 and 50 of the hose guiding device 10.

Although the preferred embodiment is of a rectangular shape, it should be recognized that the hose guiding device of the present invention may take many different forms and shapes. For example, configurations of generally square, triangular, or circular shapes or combinations thereof are possible.

Referring now to FIG. 7, number 80 identifies a second preferred embodiment of a hose guiding device of the present invention. Device 80 is similar to hose guiding device 10 shown in FIGS. 1-6 and reference numerals which refer to like items in FIGS. 1-6 are used in FIG. 7. Device 80 is similar to hose guiding device 10 except that device 80 includes channels 82. Each of the channels 82 has a first aperture 84 in the first end member 24 and a second aperture 86 in the second end member 26. The channels 82 are adapted to receive nails (not shown) to secure the device 80 to a post or other structure depending upon the particular application or position required. For example, if the hose is to be guided up a deck, then device 80 can be nailed to a deck post to secure the device 80 in place. The hose may then be inserted through the first opening 28, the inner surface 38, and out the second opening 30, as previously discussed.

It should be further recognized that the hose guiding device of the present invention can be constructed of various materials and can be assembled from separable components or formed as a unitary construction. Preferably, the hose guiding device will be of relatively lightweight material so that it can be easily positioned, secured in place, removed, and transported elsewhere for use or storage.

Although the preferred embodiment of the present invention has been described and depicted hereinabove in terms of its positioning with respect to gardens or flower beds, it should be recognized that it could be employed in association with other landscaping, such as trees, or in other areas in which movement of the hose may disturb or destroy items within the area.

From all that has been described, it will be clear that there has been shown and described herein a hose guiding device which fulfills the various objects and advantages sought therefore. It will be apparent to those skilled in the art, however, that many changes, modifications, variations, and other uses and applications of the subject hose guiding device are possible and contemplated. All changes, modifications, variations, and other uses and applications which do not depart from the spirit and scope of the invention are deemed to be covered by the invention, which is limited only by the claims which follow.

What is claimed is:

1. A hose guiding device for guiding a hose through a garden, the device adapted for placement on a ground surface of the garden, the device comprising:

a member having a conduit, the member further having a first end and a second end, the conduit having a first opening located at the first end and a second opening located at the second end, the member adapted to receive the hose through the first opening and through the conduit and out through the second opening;

means, disposed in the conduit between the first opening and the second opening, for facilitating movement of the hose through the first opening, the conduit, and out through the second opening, the means for facilitating movement comprising an inner surface having an annular shape, the inner surface having a first diameter adjacent the first opening and a second diameter at a position between the first opening and the second opening, the first diameter being greater than the second diameter;

a first aperture located on the first end and a second aperture located on the second end, and a channel formed therebetween, the channel adapted for receiving a securing member for securing the device; and means for securing the member to the ground to prevent movement of the device during use.

2. The hose guiding device of claim 1 wherein the position between the first opening and the second opening is midway between the openings.

3. The hose guiding device of claim 1 wherein the inner surface has a third diameter at the second opening.

4. The hose guiding device of claim 3 wherein the third diameter is greater than the second diameter.

5. The hose guiding device of claim 3 wherein the third diameter is equal to the first diameter.

6. The hose guiding device of claim 1 wherein the securing means comprises a retaining member which is a tack shaped stake and which is inserted through the channel.

7. A hose guiding device for guiding a hose through a garden, the device adapted for placement on a ground surface of the garden, the device comprising a base member having a ground engaging surface and at least one aperture, side members extending upwardly from the base member and first and second end members extending upwardly from the base member, an inner surface which forms a channel between the first and second end members and the side members, the first end member having a first opening through which the hose is inserted into the channel and the second end member having a second opening through which the hose is removed therefrom, the inner surface having a first diameter at the first opening and a second diameter at a position between the first opening and the second opening, the first diameter being greater than the second diameter, and a top member extending between the side members and the first and second end members, the top portion having at least one aperture with the aperture of the base member and the aperture of the top portion being in alignment with each other.

8. The hose guiding device of claim 7 wherein the inner surface is annular in shape.

9. The hose guiding device of claim 7 wherein the position between the first opening and the second opening is midway between the openings.

10. The hose guiding device of claim 7 wherein the inner surface has a third diameter at the second opening.

11. The hose guiding device of claim 10 wherein the third diameter is greater than the second diameter.

12. The hose guiding device of claim 10 wherein the first diameter is equal to the third diameter.

13. A hose guiding device for guiding a hose through a garden, the device adapted for placement on a ground surface of the garden, the device comprising a base member having a ground engaging surface and at least one aperture, side members extending upwardly from the base member and first and second end members extending upwardly from the base member, an annular inner surface formed between the first and second end members and the side members, the first end member having a first opening through which the hose is inserted and the second end member having a second opening through which the hose is removed therefrom, a top member extending between the side members and the first and second end members, the top portion having at least one aperture with the aperture of the base member and the aperture of the top portion being in alignment with each other, the inner surface having a first diameter at the first opening and a second diameter at a position between the first opening and the second opening, the first diameter being greater than the second diameter, the hose guiding device establishing a guiding configuration for the hose, such guiding configuration thereafter being maintainable while the hose is removed from the device, whereby the hose can upon return thereof be repositioned through the device in such guiding configuration.

14. The hose guiding device of claim 13 wherein the inner surface has a third diameter at the second opening.

15. The hose guiding device of claim 14 wherein the third diameter is greater than the second diameter.

16. The hose guiding device of claim 14 wherein the third diameter is equal to the first diameter.

* * * * *